July 10, 1928.
N. A. CHRISTENSEN
BRAKE CONTROL VALVE
Filed Sept. 17, 1926
1,676,980
2 Sheets-Sheet 1
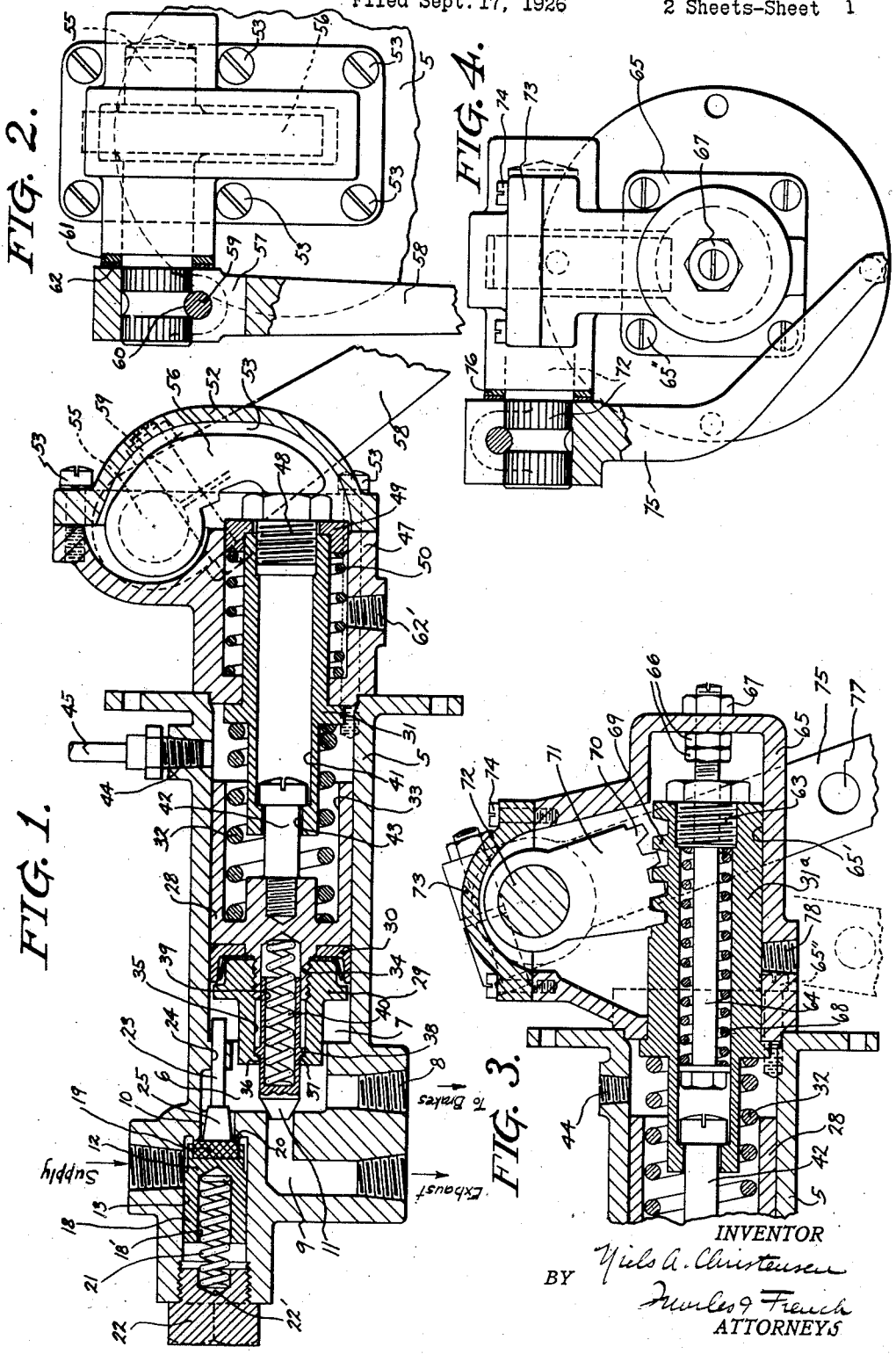
INVENTOR
Niels A. Christensen
BY
Murleo & French
ATTORNEYS July 10, 1928.
N. A. CHRISTENSEN
1,676,980
BRAKE CONTROL VALVE
Filed Sept. 17, 1926        2 Sheets-Sheet 2
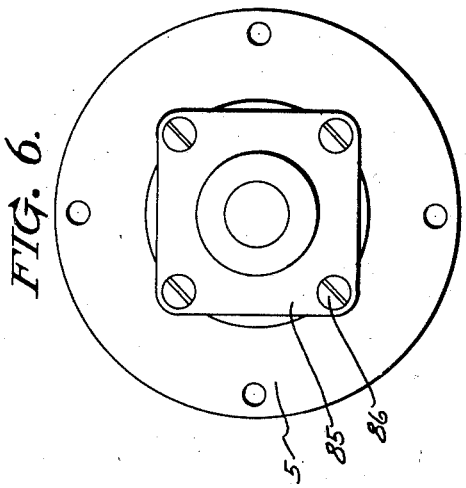
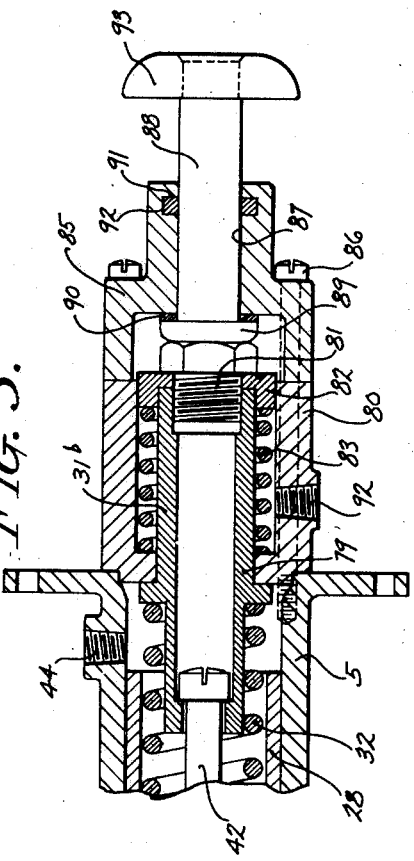
INVENTOR
Niels A. Christensen
BY
Hunter & French
ATTORNEYS Patented July 10, 1928.

1,676,980

UNITED STATES PATENT OFFICE.

NIELS A. CHRISTENSEN, OF CLEVELAND, OHIO.

BRAKE-CONTROL VALVE.

Application filed September 17, 1926. Serial No. 136,160.

The invention relates to brake control valves, more particularly adapted for use in connection with the fluid-pressure-operated brakes of automotive vehicles and trailers for such vehicles.

One object of the invention is to improve upon that type of control valve in which operating means act upon a pressure-responsive member associated with the control valves, as shown and described in my prior application, Serial No. 23,847, filed April 17, 1925, by enclosing the release spring and the operating means associated therewith so as to prevent the passage of dirt or other foreign matter into the working part of the valve mechanism.

A further object of the invention is to improve the arrangement of the inlet valve.

The invention further consists in the several features hereinafter set forth and more particularly defined by claims at the conclusion hereof.

In the drawings Fig. 1 is a vertical sectional view through control valve mechanism embodying the invention;

Fig. 2 is an end elevation view thereof, parts being shown in section;

Fig. 3 is a detail sectional view showing a somewhat modified form of actuating means, parts being broken away;

Fig. 4 is an end elevation view of the structure shown in Fig. 3;

Fig. 5 is a view similar to Fig. 3 showing another modification;

Fig. 6 is an end elevation view of the structure shown in Fig. 5;

Fig. 7 is a view similar to Fig. 1 showing a modification of the casing structure;

Fig. 8 is an end elevation view of the structure shown in Fig. 7.

The control valves and the pressure-responsive member are shown in detail in Fig. 1 but to avoid duplication they have not been shown in Figs. 3, 5 and 7, though it will be understood that they are the same.

Referring to the drawings, the numeral 5 designates a valve casing and in Fig. 1 said casing is shown as having a space 6 formed therein including a bore 7. A brake pipe passage 8, a valve-controlled exhaust 9 and a valve-controlled inlet passage 10 communicates with the space 6. A relief valve 11 controls the flow of air or other pressure fluid from the space 6 to the passage 9 and thence, in a compressed air system, to atmosphere. An inlet valve 12 controls the flow of compressed air or other pressure fluid from a bore 13 adapted to be connected with a suitable supply of pressure fluid. The passage 8 is adapted to be connected to the piping, not shown, leading to the brake cylinders.

The inlet valve 12 has a tubular portion 18 slidably mounted and accurately guided in the bore 13 of the casing and provided with a bore 18' and a head 19 of composition material inset therein and held against the seat 20 by a spring 21 mounted in the bore 18' and a seating recess 22' in a boxnut 22 in threaded engagement with the casing. Thus the valve is guided independent of the nut 22.

A push-pin 23 is slidably mounted in the passage 10 and has a stem portion mounted in a bore 24 formed in the casing. The head 25 of this pin engages the head 19 of the inlet valve 12 and is tapered to provide a gradual port opening as the pin opens the valve.

A piston or pressure-responsive member 27, formed of parts 28 and 29 and the packing 30, works in the bore 7 and is moved in one direction by pressure transmitted to it from plunger 31 of Fig. 1, 31$^a$ of Fig. 3, or 31$^b$ of Fig. 5, by a compensating spring 32, and in the opposite direction by fluid pressure acting against its inner end. The part 28 has a bore 33 in which the spring 32 seats, and a threaded tubular end portion 34. The part 29 has threaded engagement with the portion 34 whereby the medial portion of the packing disk 30 is clamped between said parts, and bores 35 and 36 alined with the bore in end portion 34, the bore 35 being of smaller diameter than the bore 36 to form a stop flange 37.

The relief valve 11 is in the form of a poppet needle-type valve having its conical head adapted to seat on the inner end of the passage 9 and having a tubular stem with a flange 38 and a bore 39. A spring 40 is mounted in the bore 39 and interposed between the end of said bore and the inner end of the bore in end portion 34, and said spring normally acts to move the valve 11 so that its flange 38 abuts against the flange 37. Thus the valve 11 is moved by and with the piston 27 through the pressure of the spring 40 and the piston may also move relative to said valve when it seats. The valve 11 is not responsive to the air pressure in the space 6 to effect its opening, but its change in position is due directly to the position and movement of the piston 28.

In each instance the plunger has a flange against which the outer end of the spring 32 abuts and a bore 41 receiving the headed end of a bolt 42 whose shank is slidably mounted in a smaller bore 43 and has its outer end in threaded engagement with the part 28 of the piston 27. This bolt permits the piston and the plunger associated therewith to move together when the pressure acting on the front face of the piston has been relieved and the spring 32 is practically relieved of its tension.

The casing 5 is also preferably provided with a vent opening 44 connected with a pipe 45 which terminates in a place on the vehicle where dirt will not get into it.

With the construction thus far described, when the plunger 31, 31ᵃ or 31ᵇ is moved inwardly the piston 27 will, through the agency of the spring 32, move inwardly, and this in turn, through the spring 40, causes the exhaust valve 11 to be moved to its seat to close off the exhaust passage 9. Further inward movement puts pressure upon the valve 11 through compression of the spring 40 and then causes the piston 27 to engage the pin 24 and move it to open the inlet valve 12, whereupon the compressed air from the source of supply flows from bore 13 and passage 10 to the space 6 and thence through passage 8 to the brake piping and brakes. As the pressure in the brake system builds up the pressure in the space 6 in front of the piston 27 increases until it overcomes the pressure being exerted by the operator through the spring 32, and when said pressure exceeds the pressure of the spring 32 the piston 27 travels away from the stem 24 and the inlet valve closes and the parts are then in a "lap" position, since the piston travel is then insufficient to relieve the pressure on the spring 40 to such an extent as to permit unseating of the valve 11, which, it will be noted, has a greater tendency to remain seated because of the pressure in the chamber 6 than to be opened, because of the differential areas of the seat and valve. Thereafter further release of the pressure on the spring 32 causes a further outward travel of the piston to open the exhaust valve 11 to release the brakes, or if further pressure is wanted in the brake system movement of the piston from its "lap" position, in which the exhaust valve is closed, to again open the inlet valve 24 accomplishes this result.

Referring to Fig. 1, the plunger 31 is slidably mounted in a bore 46 of a casing member 47 and its outer end is threaded to receive a bolt 48 which clamps a spring seat and guide member 49 thereto, the release spring 50 being mounted in a bore 51 in said member 47 and bearing against said member 49 to normally move the plunger 31 and hence the piston 27 to a release position. The casing member 47 cooperates with a cap member 52 secured thereto by screws 53 to form a space 54 and halves of a bearing for a shaft 55 which has an arm 56 working in the space 54 and engaging the head of the bolt 48. Some of the screws 53 are long enough to pass into the casing 5 so as to secure the casing section 47 thereto. A part of the shaft 55 projects outside of the casing and is serrated and receives the apertured end 57 of the foot-lever or pedal 58, a bolt 59 serving to securely clamp said lever to said shaft and having its shank passing through a part of an annular groove 60 in said shaft to hold said lever against lengthwise movement. To exclude entrance of dirt into the casing formed by the sections 47 and 52 a packing washer 61 is mounted on the shaft between the casing and a wear washer 62. A tapped hole 62' in the casing member 47 is adapted to receive a suitable lubricant fitting.

The downward swinging movement by the operator of the lever 58 causes an inward movement of the plunger 31 and operation of the control valves as previously described.

In the construction shown in Fig. 3 the plunger 31ᵃ has a sleeve bolt 63 mounted in its outer end and a bolt 64 passes through said bolt 63 and is anchored to a casing member 65 by nuts 66 and 67. The release spring 68 is interposed between the head of the bolt 64 and the end of the bolt 63. The plunger has rack teeth 69 formed thereon meshing with teeth 70 formed in the end of a lever arm 71 whose pivot shaft 72 is journalled in the bearings formed in the casing member 65 and a cap 73 secured thereto by screws 74. The plunger is guided by a bore 65' in said casing. The serrated exterior end of the shaft 72 has a lever arm 75 connected therewith as in the first-described construction and the casing is sealed as before by a packing washer 76. The lever 75 may be either the foot-pedal or be connected thereto by suitable linkage and as shown is provided with a series of holes 77 any one of which may receive the pivot pin of the link associated with the pedal. The casing 65 has a tapped hole 78 to receive a suitable lubricant fitting, and is secured to the casing 5 by screws 65''.

The forward swinging movement of the lever 71 will through the gearing connection with the plunger 31ᵃ, cause its inward movement and operation of the control valves, as previously described.

In the form shown in Fig. 5 the plunger 31ᵇ is similar to the plunger 31 and is slidably mounted in a bore 79 of a casing member 80 and its outer end is threaded to receive a bolt 81 which clamps a spring seat and guide member 82 thereto, the release spring 83 being mounted in a bore 84 in the member 80 and bearing against said member 82 to normally move the plunger 31^b and hence the piston 27 to release position. The casing member 80 is provided with a cap or casing section 85 secured thereto by bolts 86 and provided with a centrally disposed bore 87. An operating pin or push button 88 has its stem slidably mounted in the bore 87 and its enlarged inner end 89 engages the head of the bolt 81 and has a packing washer 90 disposed adjacent thereto while a packing 91 is mounted in a recess 92 in the section 85 to seal the bore 87. An operating button 93 is secured to the outer end or stem of the pin 88. The casing 80 has a tapped hole 94 to receive a suitable lubricant fitting.

The inward movement of the push-pin 88 by the operator will produce a corresponding movement of the plunger 31^b and the operation of the control valves, as previously described.

The construction shown in Figs. 7 and 8 is generally similar to that shown in Figs. 1 and 2 but the casing is divided differently.

In this form the plunger 31 works in a bore of a casing plate 95 which with a casing section 96 is secured to the main casing 5 by screws 97, and the release spring 50 is mounted in a bore 98 in the casing 96 between the plate 95 and the member 49. The section 95 has a side opening 99 covered over by a cap member 100 secured thereto by screws 101 and the pedal shaft 102 is journalled at one end in the section 95 and projects through a journal bearing 103 in the member 100 and carries an arm 104 whose outer end engages the head of the bolt 48. The extended end of the shaft 102 has the foot-pedal lever 105 secured thereto as in the first-described construction and a packing washer 106 seals the opening in the member 100 through which the shaft 102 projects. As in the first-described construction, the downward swinging movement of the lever 105 causes the arm 104 to move the plunger 31 inwardly to make a brake application.

In connection with the forms herein shown it will be noted that the operating mechanism is disposed within a sealed casing which prevents the entrance of dirt or other foreign matter into the space containing the sliding parts and thus prevents any possibility of the mechanism sticking.

I desire it to be understood that this invention is not to be limited to any particular arrangement or construction of parts except in so far as such limitations are included in the claims.

What I claim as my invention is:

1. In a brake control valve, the combination of a main casing, control valves therein, a pressure-responsive member associated with said valves, a reciprocating plunger, a compensating spring interposed between said member and plunger, a release spring normally urging the plunger to release position, a sectional casing secured to the main casing and enclosing said release spring, and means for operating said plunger including a rock-shaft journalled between the parts of said sectional casing and having an end projecting therefrom.

2. In a brake control valve, the combination of a casing provided with a chamber, inlet and exhaust ports leading from said chamber, a bore communicating with said inlet valve, an inlet valve controlling passage of pressure fluid through said inlet port and provided with a tubular portion guide in said bore, a box-nut mounted at the end of said bore, a spring seated on said nut at one end and in an opening in said tubular portion of said inlet valve, a pressure-responsive member working in said chamber for actuating said inlet valve, an exhaust valve controlling said exhaust port and carried by and movable relative to said pressure-responsive member, and means under the control of the operator for varying the power of said pressure-responsive member to resist pressure in said casing whereby to control the position and movement of said member relative to said valves.

3. In a brake control valve, the combination of a main casing, control valves therein, a pressure-responsive member associated with said valves, a reciprocating plunger projecting beyond the main casing, a compensating spring interposed between said member and plunger, a sectional casing having one of its parts provided with a guide bore for the extended end of said plunger, a guide and spring seat member secured to said plunger and working in said bore, a release spring interposed between said last-named member and a part of said casing, operating means projecting from said sectional casing, and a packing sealing the opening in said sectional casing through which said last-named means projects.

In testimony whereof I affix my signature.

NIELS A. CHRISTENSEN.